(12) United States Patent
Gao et al.

(10) Patent No.: US 10,645,402 B2
(45) Date of Patent: May 5, 2020

(54) IMAGE PROCESSING METHOD AND ELECTRONIC DEVICE

(71) Applicants: BOE Technology Group Co., Ltd., Beijing (CN); Beijing BOE Optoelectronics Technology Co., Ltd., Beijing (CN)

(72) Inventors: Bo Gao, Beijing (CN); Xue Dong, Beijing (CN); Dong Chen, Beijing (CN); Wei Sun, Beijing (CN); Lingyun Shi, Beijing (CN); Xiurong Wang, Beijing (CN); Jinxing Liu, Beijing (CN); Xiangyi Chen, Beijing (CN); Xiaochuan Chen, Beijing (CN); Jian Sun, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 158 days.

(21) Appl. No.: 15/745,034

(22) PCT Filed: Aug. 22, 2017

(86) PCT No.: PCT/CN2017/098442
§ 371 (c)(1),
(2) Date: Jan. 15, 2018

(87) PCT Pub. No.: WO2018/129924
PCT Pub. Date: Jul. 19, 2018

(65) Prior Publication Data
US 2019/0014329 A1 Jan. 10, 2019

(30) Foreign Application Priority Data
Jan. 13, 2017 (CN) .......................... 2017 1 0026212

(51) Int. Cl.
*H04N 19/186* (2014.01)
*G09G 5/00* (2006.01)
(Continued)

(52) U.S. Cl.
CPC ............ *H04N 19/186* (2014.11); *G09G 5/003* (2013.01); *G09G 5/006* (2013.01); *H04N 7/0117* (2013.01);
(Continued)

(58) Field of Classification Search
CPC .. H04N 19/186; H04N 19/132; H04N 19/182; H04N 19/61; H04N 19/70;
(Continued)

(56) References Cited

U.S. PATENT DOCUMENTS 8,548,233 B2 10/2013 Narita
2005/0069034 A1* 3/2005 Dambrackas ........ H04N 19/105
375/240.01
(Continued)

FOREIGN PATENT DOCUMENTS

CN 1669233 A 9/2005
CN 101668107 A 3/2010
(Continued)

OTHER PUBLICATIONS

Oct. 31, 2017—(WO) International Search Report and Written Opinion Appn PCT/CN2017/098442 with English Tran.
(Continued)

*Primary Examiner* — Ross Varndell
(74) *Attorney, Agent, or Firm* — Banner & Witcoff, Ltd.

(57) ABSTRACT

The present disclosure provides an image processing method and an electronic device using the image processing method. The image processing method includes: encoding, by an encoding unit, to-be-displayed image data to generate encoded image data; transmitting, via an interface compo-
(Continued)

nent, the encoded image data to a display component; and decoding, by a decoding unit in the display component, the encoded image data to generate the to-be-displayed image data for the display component to display. This image processing method can reduce data transmission amount.

14 Claims, 5 Drawing Sheets

(51) Int. Cl.
*H04N 9/64* (2006.01)
*H04N 19/146* (2014.01)
*H04N 7/01* (2006.01)
*H04N 19/423* (2014.01)
*H04N 19/124* (2014.01)
*H04N 19/85* (2014.01)

(52) U.S. Cl.
CPC .......... *H04N 9/64* (2013.01); *H04N 19/146* (2014.11); *G09G 2340/02* (2013.01); *G09G 2340/0428* (2013.01); *G09G 2350/00* (2013.01); *H04N 19/124* (2014.11); *H04N 19/423* (2014.11); *H04N 19/85* (2014.11)

(58) Field of Classification Search
CPC .... H04N 19/86; H04N 13/161; H04N 19/117; H04N 19/44; H04N 19/184; H04N 2213/005; H04N 1/60; G06T 9/00
See application file for complete search history.

(56) References Cited

U.S. PATENT DOCUMENTS

| | | | |
|---|---|---|---|
| 2011/0150101 A1* | 6/2011 | Liu | H04N 13/00 375/240.26 |
| 2013/0162625 A1* | 6/2013 | Schmit | G06T 3/40 345/419 |
| 2013/0265489 A1* | 10/2013 | Shih | H04N 5/44508 348/385.1 |
| 2014/0160250 A1* | 6/2014 | Pomerantz | H04N 5/23229 348/47 |
| 2014/0177730 A1* | 6/2014 | Chang | H04N 19/105 375/240.25 |
| 2018/0048914 A1* | 2/2018 | Cho | H04N 19/182 |

FOREIGN PATENT DOCUMENTS

| | | |
|---|---|---|
| CN | 102339592 A | 2/2012 |
| CN | 102547058 A | 7/2012 |
| CN | 103905827 A | 7/2014 |
| CN | 106713922 A | 5/2017 |

OTHER PUBLICATIONS

Jul. 10, 2019—(CN) Second Office Action Appn 201710026212.0 with English Translation.

* cited by examiner

IMAGE PROCESSING METHOD AND ELECTRONIC DEVICE

The application is a U.S. National Phase Entry of International Application No. PCT/CN2017/098442 filed on Aug. 22, 2017, designating the United States of America and claiming priority to Chinese Patent Application No. 201710026212.0 filed on Jan. 13, 2017. The present application claims priority to and the benefit of the above-identified applications and the above-identified applications are incorporated by reference herein in their entirety.

TECHNICAL FIELD

Embodiments of the present disclosure relate to an image processing method and an electronic device using the image processing method.

BACKGROUND

With the development of display panels such as LCDs, high-resolution display technologies for AR/VR have been advanced continuously. When transmitting image data for high-resolution image display as generated by an image processing unit such as a GPU in an electronic device to an image display unit such as an LCD display panel in the electronic device, a very large transmission bandwidth that satisfies high-resolution image data is required between the image processing unit and the image display unit.

SUMMARY

According to an aspect of the present disclosure, there is provided an image processing method, comprising: encoding, by an encoding unit, to-be-displayed image data to generate encoded image data; transmitting, via an interface component, the encoded image data to a display component; and decoding, by a decoding unit in the display component, the encoded image data to generate the to-be-displayed image data for the display component to display, wherein the encoding unit encodes the to-be-displayed image data having a first color depth into the encoded image data having a second color depth, the first color depth is greater than the second color depth.

In addition, in the image processing method according to an aspect of the present disclosure, the interface component is a Mobile Industrial Processor Interface.

In addition, in the image processing method according to an aspect of the present disclosure, the second color depth is three fourths (¾) of the first color depth.

In addition, in the image processing method according to an aspect of the present disclosure, before encoding, by the encoding unit, to-be-displayed image data, further comprises: generating, by an image processing unit, the to-be-displayed image data; inputting the to-be-displayed image data into a data buffering unit; and outputting the to-be-displayed image data frame by frame from the data buffering unit to the encoding unit.

In addition, in the image processing method according to an aspect of the present disclosure, outputting the to-be-displayed image data frame by frame from the data buffering unit to the encoding unit comprises: outputting the to-be-displayed image data frame by frame from the data buffering unit to a pre-compressing unit; and pre-compressing, by the pre-compressing unit, the to-be-displayed image data, and outputting the pre-compressed to-be-displayed image data to the encoding unit.

In addition, in the image processing method according to an aspect of the present disclosure, encoding, by the encoding unit, to-be-displayed image data comprises: dividing, by the encoding unit, the first color depth into a plurality of first sub-color depth ranges, each of the plurality of first sub-color depth ranges corresponding to a corresponding color depth value in the second color depth; and converting the to-be-displayed image data having a color depth value in each of the plurality of first sub-color depth ranges into the encoded image data having a corresponding color depth value in the second color depth.

According to another aspect of the present disclosure, there is provided an electronic device, comprising: an image generating component having an encoding unit configured to encode to-be-displayed image data to generate encoded image data; an interface component via which the encoded image data is transmitted; and an image display component having a decoding unit configured to decode received encoded image data transmitted via the interface unit and generate the to-be-displayed image data, wherein the encoding unit encodes the to-be-displayed image data having a first color depth into the encoded image data having a second color depth, the first color depth is greater than the second color depth.

In addition, in the electronic device according to another aspect of the present disclosure, the interface component is a Mobile Industrial Processor Interface.

In addition, in the electronic device according to another aspect of the present disclosure, the second color depth is three fourths (¾) of the first color depth.

In addition, in the electronic device according to another aspect of the present disclosure, the image generating component further comprises an image processing unit configured to generate the to-be-displayed image data and a data buffering unit configured to receive the to-be-displayed image data inputted by the image processing unit and output the to-be-displayed image data frame by frame to the encoding unit; the image display component further comprises an image display unit configured to perform image display based on the to-be-displayed image data generated by the decoding unit.

In addition, the electronic device according to another aspect of the present disclosure further comprises a pre-compressing unit configured to receive the to-be-displayed image data outputted frame by frame from the data buffering unit, perform pre-compression on the to-be-displayed image data, and outputting the pre-compressed to-be-displayed image data to the encoding unit.

In addition, in the electronic device according to another aspect of the present disclosure, the encoding unit divides the first color depth into a plurality of first sub-color depth ranges, each of the plurality of first sub-color depth ranges corresponding to a corresponding color depth value in the second color depth; and converts the to-be-displayed image data having a color depth value in each of the plurality of first sub-color depth ranges into the encoded image data having a corresponding color depth value in the second color depth.

By means of performing color depth conversion on the to-be-displayed image data generated by the image generating component, converting to-be-displayed image data having a high color depth into encoded data having a low color depth, then using the interface component to transmit the encoded data having a low color depth to the display component so as to be decoded by the display component to restore the to-be-displayed image data having a high color depth, the image processing method and the electronic device using the image processing method as provided by the present disclosure may reduce a bandwidth required for transmitting the display image of a high resolution and a high refresh rate, and decrease transmission power consumption while solving the transmission bandwidth limit of image data, thereby realizing high-resolution display of an image.

It is to be understood that both the foregoing general descriptions and the following detailed descriptions are exemplary and intended to provide further explanations of the claimed technique.

BRIEF DESCRIPTION OF THE DRAWINGS

Through more detailed description of the embodiments of the present disclosure in combination with the accompanying drawings, the above and other objects, features, and advantages of the present disclosure will become more apparent. The drawings are to provide further understanding for the embodiments of the present disclosure and constitute a portion of the specification, and are intended to interpret the present disclosure together with the embodiments rather than to limit the present disclosure. In the drawings, the same reference sign generally refers to the same component or step.

DETAILED DESCRIPTION OF THE EMBODIMENTS

To make the objects, technical solutions, and advantages of the present disclosure more clear, exemplary embodiments of the present disclosure will be described in detail with reference to the accompanying drawings as follows. Obviously, the described embodiments merely are part of the embodiments of the present disclosure, rather than all of the embodiments of the present disclosure, it should be understood that the present disclosure is not limited to the exemplary embodiments described herein. Based on the embodiments described in the present disclosure, all other embodiments obtained by those skilled in the art without paying inventive efforts should fall into the protection scope of the present disclosure.

Hereinafter, the embodiments of the present disclosure will be described in detail with reference to the drawings. Firstly, an electronic device according to an embodiment of the present disclosure is described.

Currently, interface specifications for enabling data transfer among various components in an electronic device, such as a smart phone, include Mobile Industry Processor Interface (MIPI). However, it is hard for the current MIPI D-PHY bandwidth to meet the needs of massive data transmission required by the display image having a high resolution and a high refresh rate. It is therefore desirable to provide an image processing method for reducing data transmission amount and an electronic device using the image processing method, said method and device can reduce a bandwidth required for transmitting the display image having a high resolution and a high refresh rate and decrease transmission power consumption while solving the transmission bandwidth limit of image data, thereby realizing high-resolution display of image.

Figure 1:
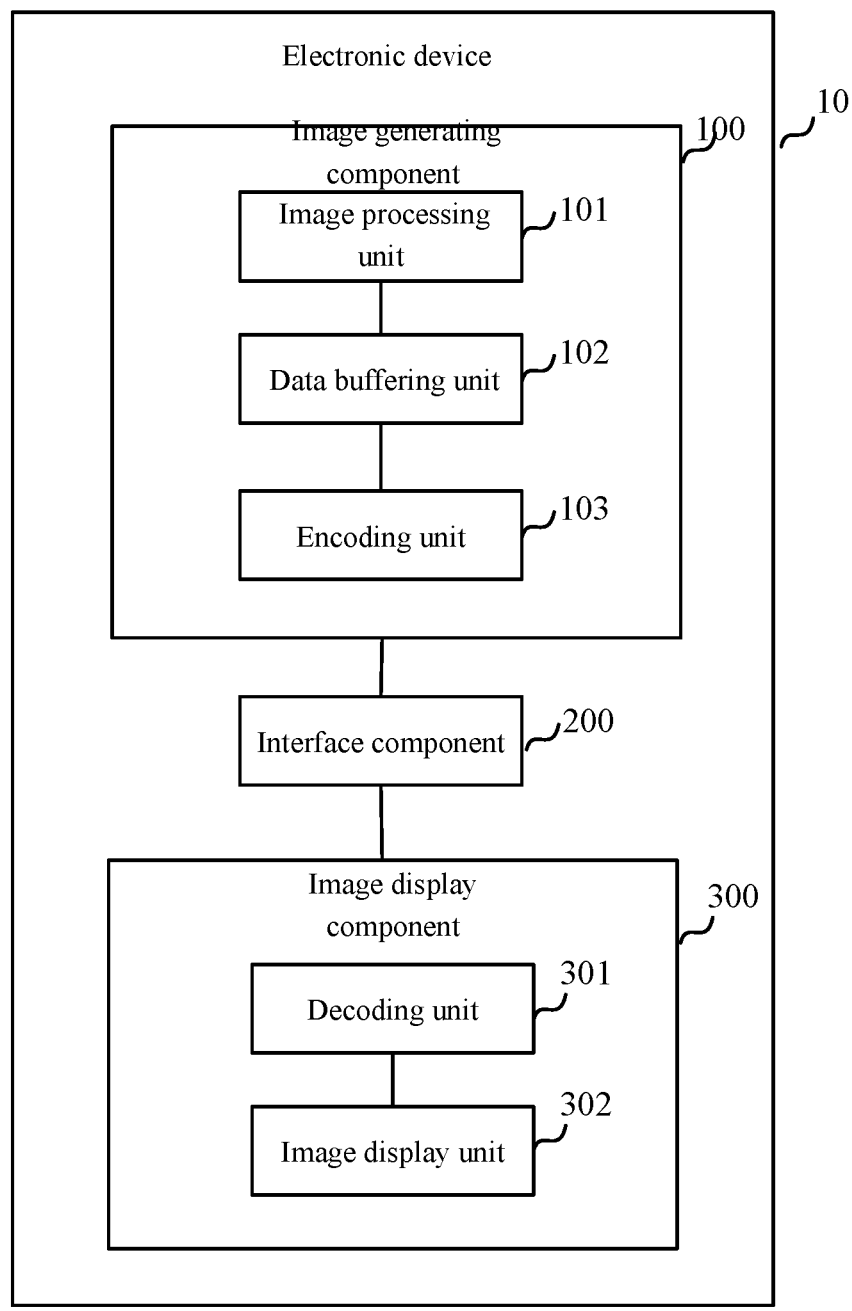
FIG. 1 is a block diagram illustrating an electronic device according to a first embodiment of the present disclosure.

FIG. 1 is a block diagram illustrating an electronic device according to a first embodiment of the present disclosure. As shown in FIG. 1, an electronic device 10 according to an embodiment of the present disclosure comprises an image generating component 100, an interface component 200, and an image display component 300. The electronic device 10 according to an embodiment of the present disclosure includes, but not limited to, a smart phone, a tablet computer, a personal computer, or the like, as long as it is an electronic device capable of performing high-resolution image display. In addition, it is easy to understand that FIG. 1 only shows components and units closely related to the present disclosure, and the electronic device 10 according to an embodiment of the present disclosure may further comprise other components and units, such as an input component, a sensing component, or the like.

Specifically, the image generating component 100 comprises an image processing unit 101, a data buffering unit 102, and an encoding unit 103. The image processing unit 101 is configured to generate to-be-displayed image data. In an embodiment of the present disclosure, the image processing unit 101 is an graphic processing unit (GPU) of the electronic device 10, and the to-be-displayed image data is, for example, a high-resolution image with 16.7 M colors and a 4K resolution.

The to-be-displayed image data generated by the image processing unit 101 is inputted to the data buffering unit 102. In an embodiment of the present disclosure, the data buffering unit 102 is a frame buffer of the electronic device 10. The data buffering unit 102 outputs the to-be-displayed image data frame by frame to the encoding unit 103.

The encoding unit 103 is configure to encode the to-be-displayed image data to generate encoded image data. In an embodiment of the present disclosure, in order to reduce the amount of image data transmitted to the subsequent image display component 300 for display, the encoding unit 103 is a color depth encoder that performs color depth encoding on the to-be-displayed image data. That is, the to-be-displayed image data having a first color depth (e.g., 16.7 M colors) is encoded to generate the encoded image data having a second color depth (e.g., 512 colors). A data transmission bandwidth for transmitting the to-be-displayed image data having the first color depth (e.g., 16.7 M colors) is 53.7 GB/s, after the encoding unit 103 encodes said data into encoded image data having the second color depth (e.g., 512 colors), a data transmission bandwidth for transmitting the encoded image data having the second color depth (e.g., 512 colors) is reduced to 20 GB/s.

Further, in an embodiment of the present disclosure, the encoding unit 103 divides the first color depth into a plurality of first sub-color depth ranges, and each of the plurality of first sub-color depth ranges corresponds to a corresponding color depth value in the second color depth. Thereafter, the to-be-displayed image data having a color depth value in each of the plurality of first sub-color depth ranges is converted into the encoded image data having a corresponding color depth value in the second color depth.

It is easy to understand that the encoding unit 103 is not limited to the color depth encoder, but may include any encoding unit capable of reducing the amount of data that needs to be transmitted via the subsequent interface component 200.

The interface component 200 is configured to transmit the encoded image data therethrough. In an embodiment of the disclosure, the interface component 200 is a Mobile Industry Processor Interface (MIPI).

The image display component 300 comprises a decoding unit 301 and an image display unit 302. The decoding unit 301 is a decoding unit corresponding to the encoding unit 103, and is configured to decode received encoded image data as transmitted via the interface module 200, and generate the to-be-displayed image data. In an embodiment of the present disclosure, the decoding unit 301 performs color depth decoding on encoded image data having the second color depth (e.g., 512 colors) to obtain the to-be-displayed image data having the first color depth (e.g., 16.7 M colors). The image display unit 302 is configured to perform image display based on the to-be-displayed image data generated by the decoding unit. In an embodiment of the present disclosure, the image display component 302 is a display panel for performing high-resolution image display.

In the electronic device 10 according to an embodiment of the present disclosure as described above with reference to FIG. 1, by configuring the encoding unit 103 at the AP end and configuring the decoding unit 301 at the display panel end correspondingly, the image data having a high color depth that needs to be transmitted is converted into the image data having a low color depth at the AP end, wherein data amount of the image data having a low color depth is significantly reduced, and the image data having a low color depth is transmitted to the display panel end via an interface component such as MIPI, and restored to the image data having a high color depth after color depth decoding is performed at the display panel end, thereafter display is performed, accordingly, the image data transmission bandwidth limit is solved, meanwhile transmission power consumption is reduced.

Next, an image processing method according to an embodiment of the present disclosure as executed by an electronic device according to an embodiment of the present disclosure will be further described with reference to the drawings.

Figure 2:
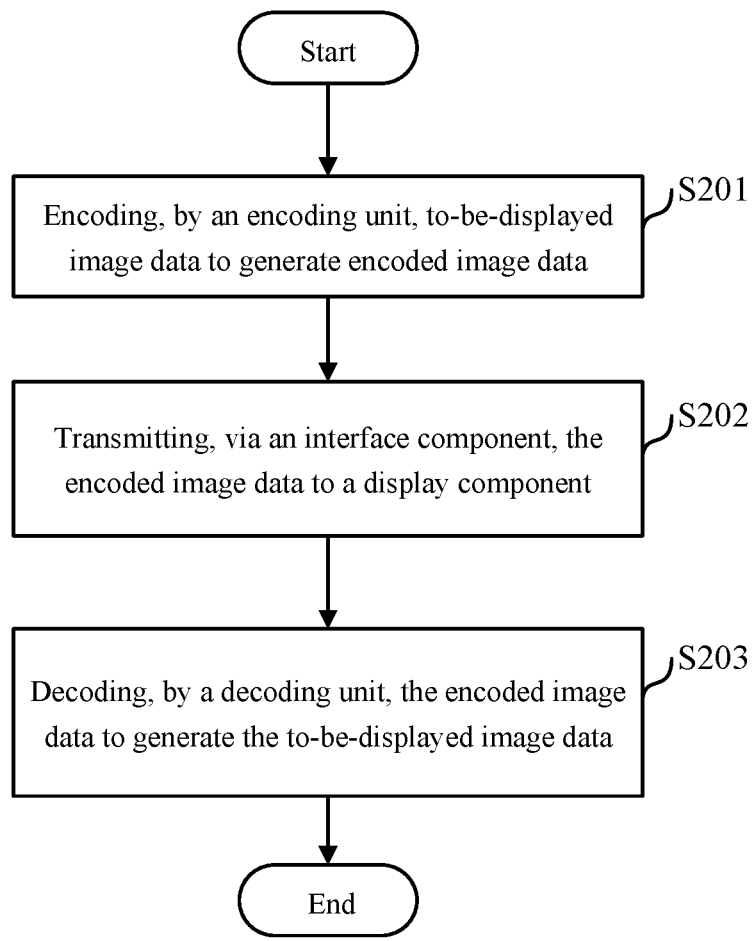
FIG. 2 is a flowchart illustrating a first example of an image processing method according to a second embodiment of the present disclosure.

FIG. 2 is a flowchart illustrating a first example of an image processing method according to a second embodiment of the present disclosure. As shown in FIG. 2, the first example of an image processing method according to an embodiment of the present disclosure comprises the following steps.

In step S201, to-be-displayed image data is encoded by an encoding unit to generate encoded image data. In an embodiment of the present disclosure, the to-be-displayed image data having a first color depth is encoded to generate encoded image data having a second color depth. The second color depth is three fourths (¾) of the first color depth. Thereafter, the process advances to step S202.

In step S202, the encoded image data is transmitted to a display component via an interface component. The interface component is a Mobile Industry Processor Interface. Thereafter, the process advances to step S203.

In step S203, the encoded image data is decoded by a decoding unit to generate the to-be-displayed image data. In an embodiment of the present disclosure, the decoding unit performs color depth decoding on the encoded image data having the second color depth to obtain the to-be-displayed image data having the first color depth. As described above, the first color depth may be divided into a plurality of first sub-color depth ranges, each of the plurality of first sub-color depth ranges corresponds to a corresponding color depth value in the second color depth. Thereafter, the to-be-displayed image data having a color depth value in each of the plurality of first sub-color depth ranges is converted into the encoded image data having a corresponding color depth value in the second color depth.

Figure 3:
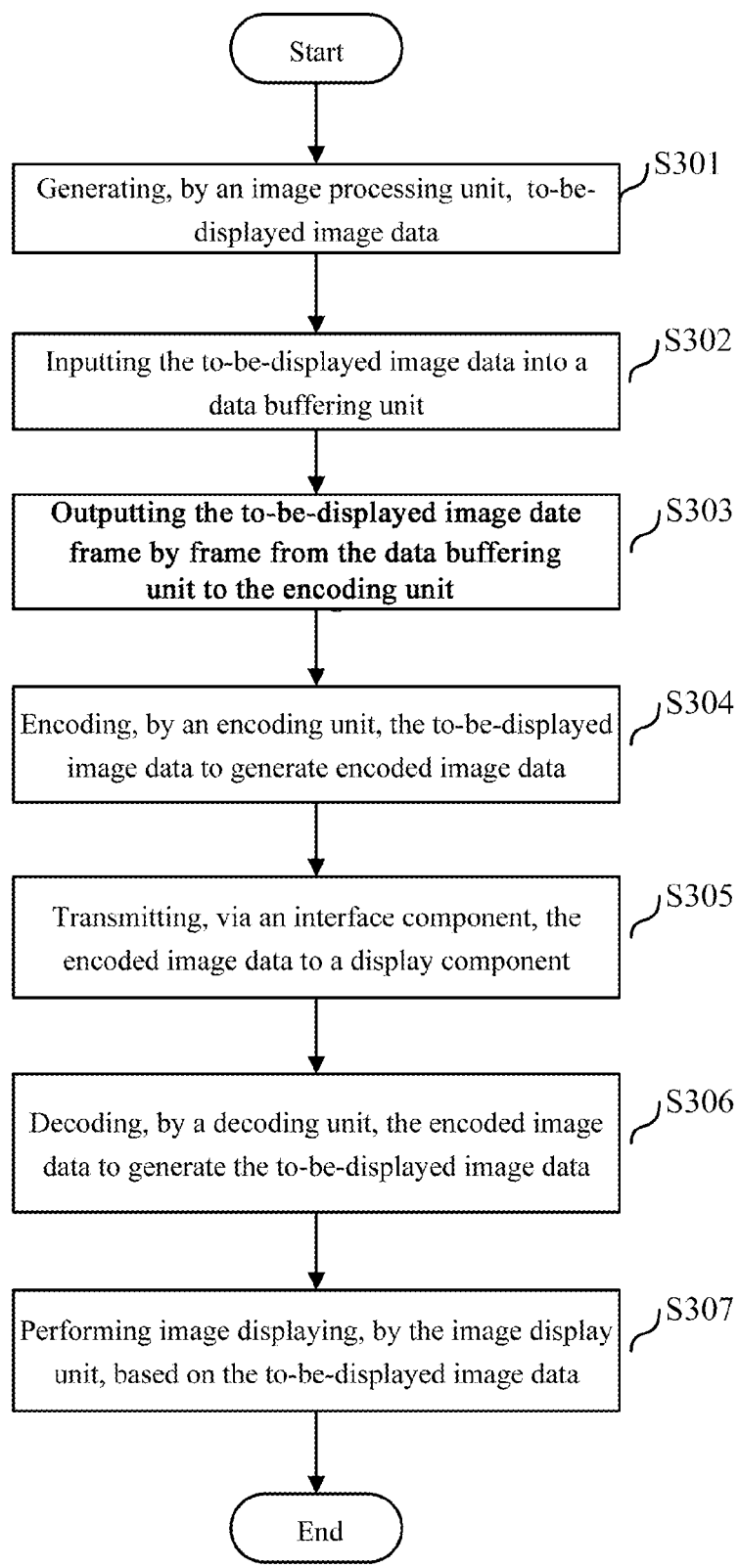
FIG. 3 is a flowchart illustrating a second example of the image processing method according to the second embodiment of the present disclosure.

FIG. 3 is a flowchart illustrating a second example of the image processing method according to the second embodiment of the present disclosure. The second example shown in FIG. 3 differs from the first example shown in FIG. 2 in that it depicts the complete image generating and display processing steps. As shown in FIG. 3, the second example of the image processing method according to an embodiment of the present disclosure comprises the following steps.

In step S301, to-be-displayed image data is generated by an image processing unit. In an embodiment of the present disclosure, a high-resolution image having 16.7 M colors and a 4K resolution is generated as the to-be-displayed image data by a graphic processing unit (GPU) of the electronic device. Thereafter, the process advances to step S302.

In step S302, the to-be-displayed image data is inputted into a data buffering unit. In an embodiment of the present disclosure, the high-resolution image having 16.7 M colors and a 4K resolution is inputted into a frame buffer of the electronic device. Thereafter, the process advances to step S303.

In step S303, the to-be-displayed image data is outputted frame by frame from the data buffering unit to an encoding unit. Thereafter, the process advances to step S304.

Steps S304 to S306 are respectively the same as steps S201 to S203 described with reference to FIG. 2, and repeated description thereof will be omitted herein. After the encoded image data is decoded by the decoding unit to generate the to-be-displayed image data in step S306, the process advances to step S307.

In step S307, image display is performed by the image display unit based on the to-be-displayed image data.

In the image processing method according to an embodiment of the disclosure as described above with reference to FIGS. 2 and 3, before the high-resolution image is transmitted via the interface component, the image data having a high color depth is converted at the AP end into the image data having a low color depth, wherein data amount of the image data having a low color depth is significantly reduced, thereafter color depth decoding is performed at the display panel end to restore the image data having high color depth, thereby the image data transmission bandwidth limit is solved, meanwhile transmission power consumption is reduced.

Figure 4:
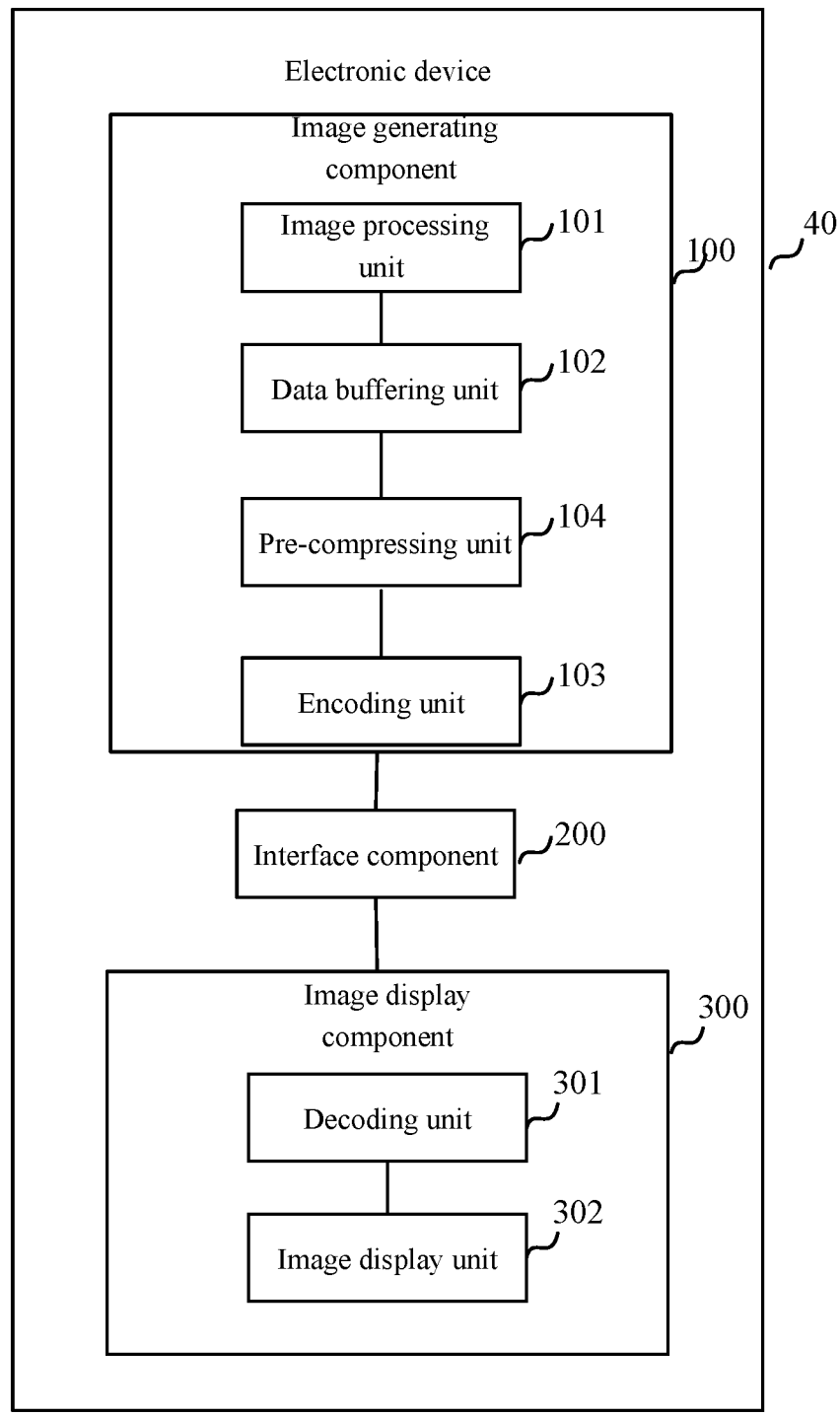
FIG. 4 is a block diagram illustrating an electronic device according to a third embodiment of the present disclosure.

FIG. 4 is a block diagram illustrating an electronic device according to a third embodiment of the present disclosure. As shown in FIG. 4, in comparison to the electronic device 10 according to the first embodiment of the present disclosure as described above with reference to FIG. 1, the electronic device 40 according to the third embodiment of the present disclosure differs in that a pre-compressing unit 104 is further configured in the image generating component 100. In addition, the other components and units of the electronic device 40 according to the third embodiment of the present disclosure shown in FIG. 4 are respectively the same as the respective components and units of the electronic device 10 according to the first embodiment of the present disclosure as described with reference to FIG. 1, thus they are indicated with the same reference signs. Herein, relevant repeated descriptions will be omitted.

As shown in FIG. 4, by means of further configuring the pre-compressing unit 104 in the image generating component 100, the electronic device 40 according to the third embodiment of the present disclosure enables, before the to-be-displayed image data is transmitted to the encoding unit, to output the to-be-displayed image data frame by frame from the data buffering unit to the pre-compressing unit, the pre-compressing unit performs pre-compression on the to-be-displayed image data and outputs the pre-compressed to-be-displayed image data to the encoding unit. In an embodiment of the present disclosure, the pre-compression processing performed by the pre-compressing unit 104 includes, but not limited to, VESA algorithm based compression, FBC algorithm based compression, or the like. By configuring the pre-compressing unit 104 to perform pre-compression on the to-be-displayed image data, the amount of data that needs to be encoded may be reduced in advance before encoding the to-be-displayed image data by the encoding unit 103, so that the encoding unit 103 performs encoding at a lower overhead and a faster speed, meanwhile the amount of data that needs to be transmitted by the backend interface component 200 is reduced.

Figure 5:
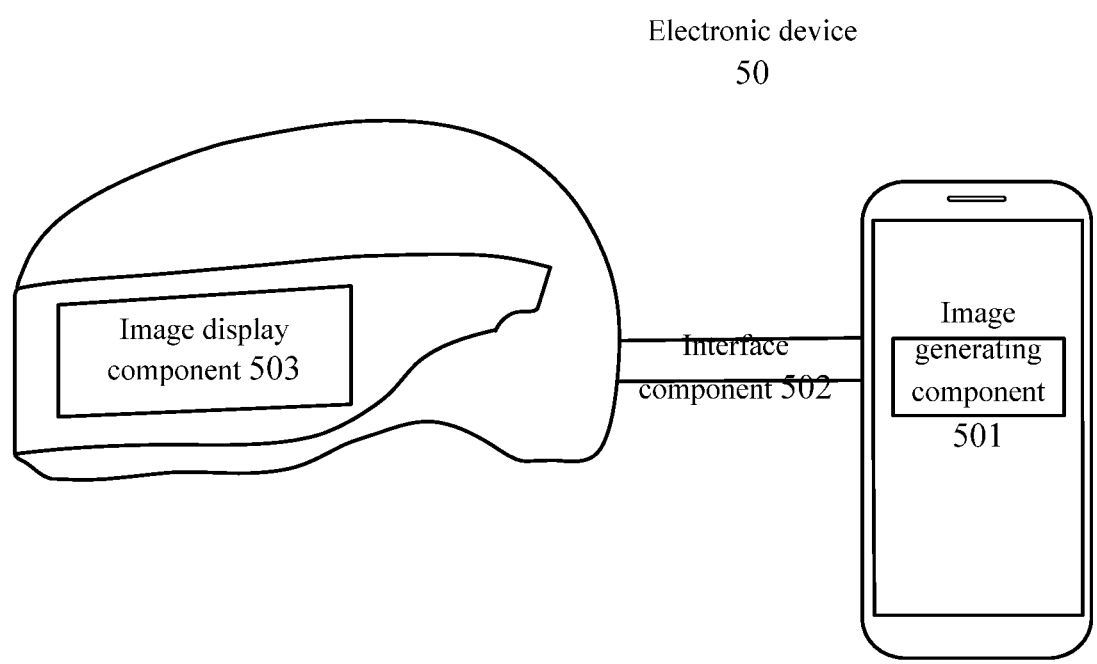
FIG. 5 is a schematic diagram illustrating an electronic device according to a fourth embodiment of the present disclosure.

FIG. 5 is a schematic diagram illustrating an electronic device according to a fourth embodiment of the present disclosure. As shown in FIG. 5, the electronic device 50 according to an embodiment of the present disclosure is, for example, a smart phone, it comprises an image generating component 501 for generating and encoding to-be-displayed image data, and an image display component 503 for performing image display, the image generating component 501 and the image display component 503 perform transmission of image data via an interface component 502. As schematically shown in FIG. 4, the image display component 503 is, for example, a display component for implementing augmented reality/virtual reality. The interface component 502 is a Mobile Industrial Processor Interface. The image generating component 501 performs encoding (e.g., color depth encoding) on, for example, a high-resolution image having 16.7 M colors and a 4K resolution, thereafter the encoded image is transmitted to the image display component 503 via the interface component 502, the image display component 503 then performs corresponding decoding (e.g., color depth decoding) to restore the original high-resolution image. As such, the amount of data that is actually transmitted via the interface component 502 is reduced.

The image processing method and the electronic device using the image processing method according to the embodiments of the present disclosure have been described above with reference to the drawings, by means of performing color depth conversion on the to-be-displayed image data generated by the image generating component, converting to-be-displayed image data having a high color depth into encoded data having a low color depth, then using the interface component to transmit the encoded data having a low color depth to the display component so as to be decoded by the display component to restore the to-be-displayed image data having a high color depth, a bandwidth required for transmitting the display image of a high resolution and a high refresh rate can be reduced, and transmission power consumption can be decreased while the transmission bandwidth limit of the image data is solved, thereby high-resolution display of image is realized.

It should be noted that, in the specification, the terms "comprise", "include" and any other variations thereof intend to cover nonexclusive inclusion so that the procedure, the method, the product or the equipment including a series of elements include not only these elements, but also other elements which are not listed explicitly, or also include inherent elements of these procedure, method, product or equipment. In the case that there is no further limitation, elements defined by the expressions "comprise one . . . " do not exclude there being additional identical elements in the procedure, method, product or equipment of the elements.

Finally, it should be noted that, the above-described series of processings do not only comprise processings executed chronologically in the order mentioned here, and also comprise processings executed in parallel or individually but not chronologically.

Through the above description of the implementations, a person skilled in the art can clearly understand that the present disclosure may be implemented in a manner of software plus a necessary hardware platform, and of course the present disclosure may also be implemented fully by hardware. Based on such understanding, the technical solution of the present disclosure that contributes to the background art may be embodied in whole or in part in the form of a software product. The computer software product may be stored in a storage medium, such as ROM/RAM, disk, CD-ROM, and include several instructions for causing a computer apparatus (which may be a personal computer, a server, or a network device) to perform the method described in the various embodiments of the present disclosure or certain parts thereof.

Although the present disclosure has been described in detail in the above, specific examples are applied in this text to demonstrate the principles and implementations of the present disclosure, these descriptions of the above embodiments are only to help understand the method of the present disclosure and its core concept. Meanwhile, for a person with ordinary skill in the art, depending on the concepts of the present disclosure, modifications may be made to the specific implementations and disclosures. To sum up, contents of this specification should not be construed as limiting the present disclosure.

The present disclosure claims priority of the Chinese Patent Application No. 201710026212.0 filed on Jan. 13, 2017, the entire disclosure of which is hereby incorporated in full text by reference as part of the present disclosure.

What is claimed is:

1. An image processing method, comprising:
   encoding, by an encoder, to-be-displayed image data having a first color depth to generate encoded image data having a second color depth;
   transmitting, via an interface, the encoded image data to a decoder; and
   decoding, by the decoder, the encoded image data to generate the to-be-displayed image data having the first color depth for display,
   wherein the second color depth is three fourths (¾) of the first color depth.

2. The image processing method of claim 1, wherein the interface is a Mobile Industrial Processor Interface.

3. The image processing method of claim 2, wherein, before the encoding the to-be-displayed image data, the method further comprising:
   generating, by an image processor, the to-be-displayed image data;
   inputting the to-be-displayed image data into a data buffer; and
   outputting the to-be-displayed image data, frame by frame, from the data buffer to the encoder.

4. The image processing method of claim 2, wherein the encoding the to-be-displayed image data comprises:

dividing, by the encoder, the first color depth into a plurality of first sub-color depth ranges, each of the plurality of first sub-color depth ranges corresponding to a corresponding color depth value in the second color depth; and converting the to-be-displayed image data, having a color depth value in each of the plurality of first sub-color depth ranges, into the encoded image data, wherein the encoded image data has a corresponding color depth value in the second color depth.

5. The image processing method of claim 1, wherein, before encoding the to-be-displayed image data, the method further comprising:

generating, by an image processor, the to-be-displayed image data;

inputting the to-be-displayed image data into a data buffer; and outputting the to-be-displayed image data, frame by frame, from the data buffer to the encoder.

6. The image processing method of claim 5, wherein the outputting the to-be-displayed image data, frame by frame, from the data buffer to the encoder comprises:

outputting the to-be-displayed image data, frame by frame, from the data buffer to a processor for pre-compression; and pre-compressing, by the processor for pre-compression, the to-be-displayed image data, and outputting the pre-compressed to-be-displayed image data to the encoder.

7. The image processing method of claim 1, wherein the encoding the to-be-displayed image data comprises:

dividing, by the encoder, the first color depth into a plurality of first sub-color depth ranges, each of the plurality of first sub-color depth ranges corresponding to a corresponding color depth value in the second color depth; and converting the to-be-displayed image data, having a color depth value in each of the plurality of first sub-color depth ranges, into the encoded image data, wherein the encoded image data has a corresponding color depth value in the second color depth.

8. An electronic device, comprising:

an encoder, configured to encode to-be-displayed image data having a first color depth to generate encoded image data having a second color depth;

an interface via which the encoded image data is transmitted; and a decoder, configured to decode received encoded image data transmitted via the interface to generate the to-be-displayed image data having the first color depth, wherein the second color depth is three fourths (¾) of the first color depth.

9. The electronic device of claim 8, wherein the interface is a Mobile Industrial Processor Interface.

10. The electronic device of claim 9, further comprising:

an image processor, configured to generate the to-be-displayed image data;

a data buffer, configured to receive the to-be-displayed image data inputted by the image processor and output the to-be-displayed image data, frame by frame, to the encoder; and an image display, configured to perform image display based on the to-be-displayed image data generated by the decoder.

11. The electronic device of claim 9, wherein the encoder divides the first color depth into a plurality of first sub-color depth ranges, each of the plurality of first sub-color depth ranges corresponding to a corresponding color depth value in the second color depth; and converts the to-be-displayed image data, having a color depth value in each of the plurality of first sub-color depth ranges, into the encoded image data, wherein the encoded image data has a corresponding color depth value in the second color depth.

12. The electronic device of claim 8, further comprising:

an image processor, configured to generate the to-be-displayed image data;

a data buffer, configured to receive the to-be-displayed image data inputted by the image processor and output the to-be-displayed image data, frame by frame, to the encoder; and an image display, configured to perform image display based on the to-be-displayed image data generated by the decoder.

13. The electronic device of claim 12, further comprising:

a processor for pre-compression, configured to receive the to-be-displayed image data, outputted frame by frame from the data buffer, perform pre-compression on the to-be-displayed image data, and output the pre-compressed to-be-displayed image data to the encoder.

14. The electronic device of claim 8, wherein the encoder divides the first color depth into a plurality of first sub-color depth ranges, each of the plurality of first sub-color depth ranges corresponding to a corresponding color depth value in the second color depth; and converts the to-be-displayed image data, having a color depth value in each of the plurality of first sub-color depth ranges, into the encoded image data, wherein the encoded image data has a corresponding color depth value in the second color depth.

* * * * *